US007116974B2

(12) United States Patent
Begeja et al.

(10) Patent No.: US 7,116,974 B2
(45) Date of Patent: Oct. 3, 2006

(54) METHOD AND SYSTEM FOR REMOTE CALL FORWARDING OF TELEPHONE CALLS FROM AN IP CONNECTION

(75) Inventors: Lee Begeja, Gillette, NJ (US); Jeffrey J Farah, North Brunswick, NJ (US); Neil A Ostroff, Kirkland, WA (US)

(73) Assignee: Cingular Wireless, II LLC, Atlanta, GA (US)

( * ) Notice: Subject to any disclaimer, the term of this patent is extended or adjusted under 35 U.S.C. 154(b) by 492 days.

(21) Appl. No.: 10/426,046

(22) Filed: Apr. 29, 2003

(65) Prior Publication Data

US 2004/0076140 A1    Apr. 22, 2004

Related U.S. Application Data

(63) Continuation of application No. 09/664,564, filed on Sep. 18, 2000, now Pat. No. 6,571,094, and a continuation-in-part of application No. 09/010,616, filed on Jan. 22, 1998, now Pat. No. 6,141,545.

(51) Int. Cl.
    *H04M 3/42*     (2006.01)
(52) U.S. Cl. .................. 455/417; 455/445; 455/414.1; 379/211.01; 379/142.07; 370/352; 370/401
(58) Field of Classification Search ................ 455/417, 455/445, 414.1; 379/211.01, 142.07; 370/352, 370/401
    See application file for complete search history.

(56) References Cited

U.S. PATENT DOCUMENTS 6,125,126 A * 9/2000 Hallenstål .................... 370/522

| | | | |
|---|---|---|---|
| 6,320,857 B1 * | 11/2001 | Tonnby et al. ............... | 370/352 |
| 6,526,033 B1 * | 2/2003 | Wang et al. ................. | 370/338 |
| 6,680,935 B1 * | 1/2004 | Kung et al. .................. | 370/352 |
| 6,718,026 B1 * | 4/2004 | Pershan et al. ........ | 379/211.01 |
| 6,876,632 B1 * | 4/2005 | Takeda ........................ | 370/259 |

* cited by examiner

*Primary Examiner*—Danh Cong Le
(74) *Attorney, Agent, or Firm*—Banner & Witcoff, Ltd.

(57) ABSTRACT

A subscriber to a remote call forwarding feature on a wire-line telephone line associated with a PBX (101) or central office (402), hereinafter, a "user", can enable that feature by entering a feature code from an IP terminal (112, 412). The user enters a feature code from his/her IP terminal (112, 412), which feature code is received by a remote server (for example, server 110) having access to an IP user directory (113, 413), hereinafter, for example, an active user registry (AUR) database, and forwards necessary information for invoking the feature in a determined manner to a Service Control Point (SCP) (106, 406). The SCP recognizes the feature code as a request to invoke the remote call forwarding feature on the user's wire-line telephone so that calls directed to that wire-line telephone are forwarded to, for example, the user's cellular phone. Receipt of that feature code by the SCP, identifies the cellular phone's Electronic Serial Number (ESN) from a provided cellular phone number or Mobile Identification Number (MIN) and identifies the user and the feature to be invoked for that user. By performing an SCP database (108, 408) lookup associated with that ESN and MIN, information is retrieved relating to what PBX (101) or switch (402) should be contacted to invoke the feature, how and where to contact that PBX or switch, and what specifically must be sent to that PBX or switch to invoke the feature on the user's telephone line.

19 Claims, 4 Drawing Sheets

FIG. 2A

| 201 | 202 | 203 | 204 | 205 | 206 | 207 | 208 | 209 | 211 |
|---|---|---|---|---|---|---|---|---|---|
| MIN-ESN | PBX TELEPHONE # | EXTENSION | TYPE PBX | PASSWORD | HOW ACCESS PBX | ADDRESS OR TELEPHONE # ASSOCIATED WITH ACCESS | TRANSLATION COMMANDS | SPECIAL PROTOCOLS | IP TERMINAL ACTIVE USER REGISTRY |
| .... | .... | .... | .... | .... | .... | .... | .... | .... | 211a .. 211b |
| 2015559876/XYZ123 (210) | 7325554000 | 4321 | DEFINITY G3 | *#HELP | CORPORATE INTRANET | 123.456.78.90.12 | .. | .. | Johndoe@ AUR.COM \| John Doe IDENTITY |
| .... | .... | .... | .... | .... | .... | .... | .... | .... | .... |

FIG. 2B

| | 215 | 220 | 230 | 240 | 250 | 260 | 270 | 280 | 290 | 295 |
|---|---|---|---|---|---|---|---|---|---|---|
| USER 1 (221) | Username UserAlias1 UserAlias2 ... | HomePhone1 HomePhone2 WorkPhone WorkSecretary CellularPhone1 VideoPhone ... | WorkVoiceMessages Home AnsweringMachine VideoMailMessages BeeperNumber1 ... | Email1 Email2 ... | WorkFAX1 WorkFAX2 HomeFAX ... | LAN IP ModemIP ... | URL1 URL2 ... | Multimedia1 Multimedia2 ... | Reach Number ... | How Access SCP ... |
| USER 2 (222) | Username UserAlias1 UserAlias2 ... | HomePhone1 HomePhone2 WorkPhone WorkSecretary CellularPhone1 VideoPhone ... | WorkVoiceMessages Home AnsweringMachine VideoMailMessages BeeperNumber1 ... | Email1 Email2 ... | WorkFAX1 WorkFAX2 HomeFAX ... | LAN IP ModemIP ... | URL1 URL2 ... | Multimedia1 Multimedia2 ... | Reach Number ... | How Access SCP ... |
| USER 3 (223) | Username UserAlias1 UserAlias2 ... | HomePhone1 HomePhone2 WorkPhone WorkSecretary CellularPhone1 VideoPhone ... | WorkVoiceMessages Home AnsweringMachine VideoMailMessages BeeperNumber1 ... | Email1 Email2 ... | WorkFAX1 WorkFAX2 HomeFAX ... | LAN IP ModemIP ... | URL1 URL2 ... | Multimedia1 Multimedia2 ... | Reach Number ... | How Access SCP ... |
| ... | ... | ... | ... | ... | ... | ... | ... | ... | ... | ... |
| USER N | Username UserAlias1 UserAlias2 ... | HomePhone1 HomePhone2 WorkPhone WorkSecretary CellularPhone1 VideoPhone ... | WorkVoiceMessages Home AnsweringMachine VideoMailMessages BeeperNumber1 ... | Email1 Email2 ... | WorkFAX1 WorkFAX2 HomeFAX ... | LAN IP ModemIP ... | URL1 URL2 ... | Multimedia1 Multimedia2 ... | Reach Number ... | How Access SCP ... |

US 7,116,974 B2

METHOD AND SYSTEM FOR REMOTE CALL FORWARDING OF TELEPHONE CALLS FROM AN IP CONNECTION

This application is a continuation-in-part application of U.S. patent application Ser. No. 09/010,616 filed Jan. 22, 1998 now U.S. Pat. No. 6,141,545 entitled "Method and System for Remote Call Forwarding of Telephone Calls from a Cellular Phone" by Lee Begeja, Jeffrey Farah and Neil Ostroff.

TECHNICAL FIELD

This invention relates to telecommunications, and more particularly, to a method and system for remotely initiating a call forwarding feature associated with a user's home or office telephone line via an IP connection to the network, for example, from the user's E-MAIL address so that calls are automatically forwarded, for example, to a cellular telephone assigned to the user from the user's home or office telephone.

BACKGROUND OF THE INVENTION

U.S. patent application Ser. No. 08/823,944, filed Mar. 25, 1997 and published under EP 0 872 998 A1 on Oct. 21, 1998, defines the terms "user" and "subscriber" as related directly to called party and calling party respectively in a telecommunications context and describes an active user registry (AUR), also referred to in U.S. Pat. No. 6,055,510. Referring to FIG. 2B, taken in part from EP 0 872 998 A1 and supplemented in accordance with the present invention, there is shown an example of an active user registry (AUR) in which a user, typically a called party, inputs and stores for use by subscribers, calling parties trying to reach the called parties, a thorough list of personal telecommunications parameters. The thorough list of personal telecommunications parameters includes but is not limited to the user's name and aliases 215, their home phone, work phone, cellular phone 220, e-mail address 240, URL 270 and reach number 290. The active user registry is one example of a network directory function for providing directory information about a user identifying, for example, all the possible ways a subscriber may reach a user such as by e-mail, by telephone at work or home, by facsimile at work or home, by pager, by cellular phone, by a personal display device (PDA) and the like.

The user may access the AUR and provide a current reach address so a subscriber may locate the user who accesses the AUR. There is no means, however, disclosed by which the user enters (or knows) their cellular mobile identification number-electronic serial number (MIN-ESN) or other cellular telephone service related information or can follow the steps disclosed in commonly assigned, parent U.S. patent application Ser. No. 09/010,616 whereby a user may activate remote call forwarding from their home or PBX office phone to their cellular phone from their cellular phone. For convenience, the terms "user" and "subscriber" will be used consistently herein with the manner suggested by the '944 application.

Call forwarding is a feature commonly available through many telephone companies that enables a user as just defined to automatically have his/her telephone calls forwarded to another telephone number from the telephone line to which calls were initially directed. Remote call forwarding simply means that one can access call forwarding remotely, i.e. from another phone not associated with the feature. For example, when remote call forwarding is activated, a subscriber dialing the user at their PBX will reach the user at their cellular telephone according to the commonly assigned, prior '616 application once the user has remotely activated the feature from their cellular telephone not having the feature.

In its basic implementation, a user implements remote call forwarding by dialing a feature code from the telephone associated with the subscribed-to service and inputs the forwarding telephone number to which he wants subsequent calls directed. The central office switch recognizes the feature code and the telephone line from which the user has dialed, and the central office switch thereafter redirects calls from the user's telephone line to the forwarding telephone number. For remote call forwarding, again, the subscriber is not at the phone that is associated with the feature.

Two methods for remote call forwarding are commonly available: a network service or using specialized subscriber equipment connected to the subscriber's telephone line. As a network service, in order to invoke call forwarding to the telephone at the subscriber's current location, the subscriber makes an actual phone call to a designated special telephone number associated with his local switch, provides the number of the telephone associated with his local switch, provides the number of the telephone associate with the subscribed-to feature, inputs a PIN to prevent unauthorized call forwarding, and then inputs a feature code designated for call forwarding. The telephone number from which the subscriber initiates the procedure is recognized by the network and the subscriber's central office switch thereafter directs calls from the subscriber's telephone line to the telephone line from which the remote call forwarding feature has been invoked.

Using specialized subscriber equipment, in order to invoke remote call forwarding, the subscriber places a call to his specialized equipment, inputs a PIN to prevent unauthorized call forwarding, and then inputs the telephone number to which calls should be forwarded. The specialized equipment then connects to the subscriber's telephone number following the same procedure as basic call forwarding. The central office switch recognizes the feature code and the telephone line from which the subscriber's specialized equipment has dialed and the central office switch thereafter redirects telephone calls from the subscriber's telephone line to the forwarding telephone number.

Both basic call forwarding and remote call forwarding are features that can be associated with a subscriber's home telephone in which calls are redirected by the subscriber's switch in the local exchange office. Basic call forwarding and remote call forwarding are also features that can be associated with a telephone connected to a PBX in a corporate environment. As described above, for basic call forwarding the user enters a feature code from his telephone together with the telephone number to which calls are to be directed. For remote call forwarding, the user must dial a specific extension on the PBX, enter his own extension number, and a PIN. Once call forwarding is invoked, the PBX thereafter places an outbound telephone call to the forwarding telephone number in response to an inbound call directed to the forwarder's telephone number and bridges the inbound and outbound telephone calls.

A user of a mobile cellular telephone can invoke remote call forwarding to his cellular telephone from his home or office telephone in a manner described above. Thus, as described above, the user must dial a special telephone number, which number is either associated with his local switch or PBX, and then enter his telephone number and a PIN. Disadvantageously, such a procedure over a wireless cellular network can proved security problems that are not present when remotely invoking a call forwarding feature from a telephone on the secure wire-line telephone system. Specifically, since a user's touch-tone inputs on the cellular phone can possibly be intercepted, an eavesdropper could illegal obtain a user's telephone number and password and then remotely invoke the call forwarding feature to forward calls to some desired telephone number.

In the commonly assigned, parent application U.S. Ser. No. 09/010,616, filed Jan. 22, 1998, we described a method and system for remotely call forwarding calls directed to a subscriber's home or business phone line to the subscriber's cellular phone from their cellular phone.

An object of the present invention is to securely invoke a remote call forwarding feature for a subscriber's wire-line telephone from the subscriber's home or business phone to the subscriber's cellular phone from an IP connection.

SUMMARY OF THE INVENTION

In accordance with the present invention, a user of a remote call forwarding feature enables that feature on his/her wire-line telephone line by accessing an Internet or other server and entering a feature code via an IP connection to the server. Specifically, the subscriber, for example, enters a feature code from his personal computer or other Internet work station on to a displayed web page displaying remote call forwarding actuation data and entry fields, which feature code is received by the server. An active user registry (AUR) or related directory similar to that disclosed in EP 0 872 998 A1 but modified to include a field(s) for Service Control Point (SCP) access is utilized by the server for setting up the remote call forwarding service requested by the user. The AUR may be associated with an SCP in one embodiment, may be associated with a special server in a TCP/IP network in another embodiment, or may be associated with a server of the user's ISP or other server in yet another embodiment. In the embodiment where the AUR is associated with an SCP, a database normally associated with an SCP may be combined with the AUR database into a common database in yet a further embodiment. The server then accesses this directory (the AUR either being combined with the SCP database or stand-alone) so that the user may be identified and associated with the user's other telecommunications reach capabilities, in the present example, their work and cellular telephone numbers. Sufficient information such as the feature code and user identification, for example, by cell and work phone number is passed to the user's SCP where the cellular phone's Electronic Serial Number (ESN) and Mobile Identification Number (MIN) (the cellular phone's telephone number) are stored in the SCP associated database, the MIN-ESN together uniquely identifying the subscriber for cellular service purposes. The SCP recognizes the feature code as a request to invoke a remote call forwarding feature on the subscriber's office or home wire-line telephone line on which the remote call forwarding feature is subscribed to by the user or is available to the user. By performing, at the SCP, a database lookup associated with that user as determined by the MIN and ESN and/or the work phone number, the PBX phone line or home telephone phone line on which call forwarding is to be invoked and how to invoke the service is determined. Further information is retrieved in association with the user's identity including information relating to the specific equipment (e.g., the PBX or local switch) on which the call forwarding is to be invoked, the user's telephone number or extension on the PBX, the user's PIN, in an embodiment in which the PBX or local switch requires a PIN to invoke the feature, and a network address or telephone number through which the local switch or PBX can be reached. This information, together with the MIN, is then sent over a secure transmission medium to such network address or telephone number to the PBX or local switch, which in response thereto, then invokes the remote call forwarding feature for the user's line to forward calls to the identified MIN. Advantageously, remote call forwarding to the cellular phone may be securely affected without requiring the user to enter a PIN. Further, the present invention can be used to remotely invoke through a user's IP connection other features associated with a user's wire-line office or home phone line.

BRIEF DESCRIPTION OF THE DRAWINGS

FIG. 2A shows an example of an SCP database associated with a Service Control Point (SCP) that stores the information necessary to contact the user's PBX and further contains MIN/ESN;

FIG. 2B shows an example of an active user registry (AUR) database associated with a server for providing directory information sufficient to match against information stored in the SCP database of FIG. 2A to permit MIN/ESN retrieval for remote call forwarding to a cellular telephone, the AUR database storing information on how to access the SCP database of FIG. 2A;

DETAILED DESCRIPTION

Figure 1:
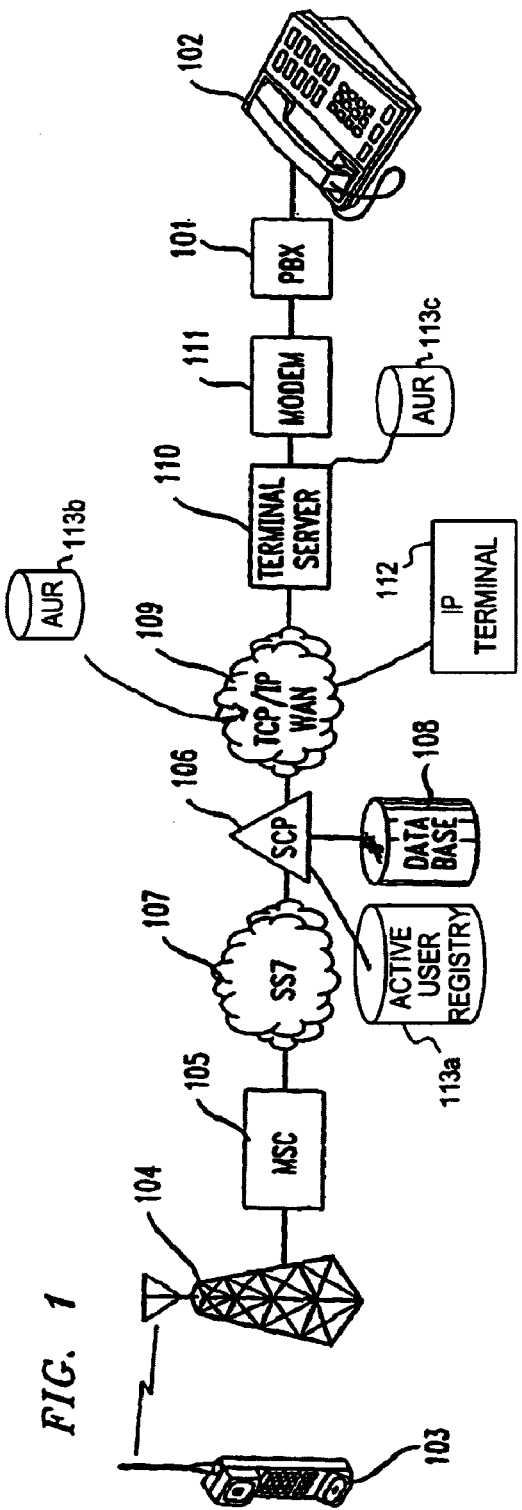
FIG. 1 is a block diagram of an embodiment of the present invention showing a user's cellular telephone invoking a remote call forwarding feature associated with his office PBX telephone station via an IP connection.
Figure 4:
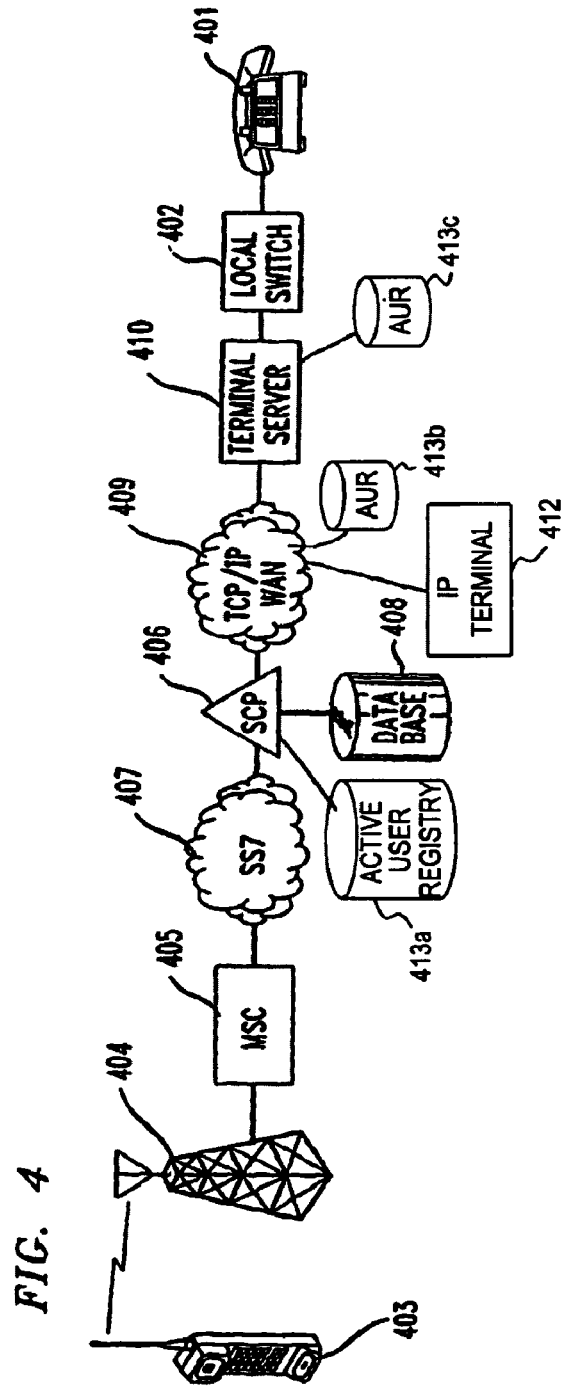
FIG. 4 is a block diagram of an embodiment of the present invention showing a user's cellular telephone invoking a remote call forwarding feature associated his home telephone line via an IP connection.

With reference to FIG. 1, an example of invoking remote call forwarding from an IP connection for a user's office phone will be discussed while an example of invoking remote call forwarding from a home telephone will be subsequently discussed with reference to FIG. 4. In FIG. 1, users of telephones connected to PBX 101, such as telephone 102, are assumed to be capable of remotely call forwarding calls directed to their telephone extension. PBX 101 may conventionally have wired telephones 102 and may comprise a fixed wireless PBX. In the embodiment of FIG. 4, telephone 401 may comprise a fixed wireless telephone or a wired telephone.

Depending on the particular PBX equipment, such call forwarding may be effected only from another telephone directly connected to the PBX. An example of such a PBX may be the Definity® G3 PBX available from Lucent Technologies, Inc. Other PBXs may allow a telephone not directly connected to the PBX to dial into a special extension number and through an interaction with the user, invoke the remote call forwarding feature for an identified PBX line so that calls originating from within or outside the PBX environment can be forwarded to the user's called-from telephone number, the latter being from either inside or outside the PBX environment.

In accordance with the present invention, the user associated with telephone 102 invokes the remote call forwarding feature on his/her associated PBX 101 by entering a feature code from an IP connection of an IP terminal 112 to a remote server. The remote server may be anywhere in the TCP/IP network 109 or accessible by such network in the same or similar manner as he/she would dial the feature code from his/her mobile cellular telephone 103 in accordance with the commonly assigned, parent '616 patent application, so that calls directed to his/her telephone extension on PBX 101 are automatically forwarded to their cellular telephone 103.

Specifically, in an example provided for illustrative purposes as one example of a feature of the present invention of invoking call forwarding from an IP connection, the user can access their IP service provider or other remote server via an IP connection from IP terminal 112 and effectuate a remote call transfer feature of their office or home telephone 102 to their cellular telephone 103. The remote server has access to an AUR database 113a associated with an SCP 106 or, in a further embodiment, an AUR database 113b associated with TCP/IP network 109 or, in yet another embodiment, an AUR database 113c associated with a terminal server 110 coupled to PBX 101. In yet a further embodiment of the present invention, SCP database 108 and AUR database 113a may be combined as into the same database.

The remote server then accesses an SCP database 108 (or a combined database 108/113a) via an SCP 106 having the user's MIN/ESN data. When a user's cellular telephone 103 registers via his cellular telephone's embedded Electronic Serial Number (ESN) and Mobile Identification Number (MIN) through cell tower 104 with the nearest Mobile Switching Center (MSC) 105, the user, after invoking remote call forwarding from their IP connection, will receive a remotely call forwarded call from a subscriber trying to dial the user at their home or PBX according to the present invention. As is known in the art, the combination of the ESN and MIN uniquely identifies the user associated with cellular telephone 103 to MSC 105.

In order to invoke remote call forwarding of calls to his/her PBX-associated telephone 102 to his/her cellular telephone 103 via IP terminal 112, the user inputs a feature code from IP terminal 112 to a user screen for activating remote call forwarding. The user screen may, in a preferred embodiment, comprise a web page accessible from a web site of the user's IP service provider or other associated entity, for example, a terminal server 110 for PBX 101. Alternatively, the remote server and associated AUR 113 may be anywhere in the TCP/IP or WAN network or accessible from the network 109 (see, for example, AUR database 113a or alternative AUR database 113b or server 110/AUR database 113c). AUR databases 113a, 113b and 113c may be collectively referred to herein as AUR database 113.

The user, for example, may input a feature code via the web page/user screen which may be the same feature code he/she would dial from his cellular telephone 103 such as, for example, *37 if practicing our prior invention. Such a feature code would be designated by the cellular provider as a feature code for invoking remote call forwarding to the called-from cellular phone of calls to its users' PBX-associated telephone lines according to our prior invention.

Upon receiving the feature code *37 entered via the IP connection of terminal 112, a remote server may recognize that it must effectuate remote call forwarding and performs a UAR database 113a, 113b or 113c (FIG. 2B) look-up of information associated with the user. Such information includes, at least, the office telephone number and the cellular telephone number or MIN. The server further obtains SCP access information from field 295 of the AUR database 113 according to the present invention. Field 295 describes how to securely access SCP database 108 (FIG. 2A) via an SCP 106. Using such information, the remote server having the AUR database 113 feature may access the SCP database 108 in a secure manner that contains both the MIN and ESN of cellular set 103. To do so, the server may send the feature code together with the identity of the user and their PBX and cellular phone numbers in a manner determined by field 295 of the AUR database 113 (FIG. 2B) to SCP 106 over a secure network for further processing. The secure network can be any secure data path between network 109 and SCP 106 and as shown in FIG. 1. The connection to SCP 106 could be over any secure network such as a wireless data network, or secure Internet network. Further, as suggested above, the SCP database 108 and AUR database 113 may be integrated at a single location with SCP 106, therefore eliminating the need for any network being interposed there between. In this embodiment, the AUR database 113b may not require any knowledge from database 108 and so be self-contained. In a further embodiment, SCP database 108 containing MIN/ESN data may be integrated with AUR databases 113a, b or c.

SCP 106 recognizes the received feature code as a request to invoke a special feature, specifically a remote call forwarding feature upon receiving the feature code. At SCP 106, SCP database 108 is accessed as necessary in response to the special feature requested by the user at IP terminal 112 and the unique MIN/ESN identity of the user associated with cellular phone 103 is learned. SCP database 108 includes a record associated with both the MIN and ESN of each user that contains the information required to access that user's PBX to invoke the remote call forwarding feature to forward calls to cellular phone 103. The record can be positively identified by the combination of CellularPhone1 (MIN) and WorkPhone number combination from field 220 of one of AUR databases 113a–c (FIG. 2B).

FIG. 2A is an example of the type of information stored in fields of SCP database 108 and AUR databases 113a/113b/113c in combination needed to invoke the remote call forwarding feature at the user's associated PBX to the cellular phone 103. The commonly assigned prior '616 application does not indicate any means such as field 211 for associating IP terminal 112 with their IP address, Internet service provider data 211a or other user identity data 211b for matching a user connecting thereto over an IP connection. The commonly assigned prior '616 application discloses fields 201–209 that may not provide sufficient information for a user to effectuate remote call forwarding from an IP terminal 112. More specifically, fields 201–209 include the particular information which is required by the PBX 101 to invoke remote call forwarding, in what format that information should be sent, where that information should be sent, and how that information should be sent with field 201 providing the cellular telephone number (MIN) and ESN of the user's cellular phone.

An active user registry (FIG. 2B) as disclosed in prior patents of others contains common fields 220 to these fields but not a MIN-ESN data field 201. In accordance with the present invention, an AUR database (FIG. 2B) is modified to contain field 295 containing information on how to securely reach SCP 106 and associated SCP database 108. FIG. 2B contains for a each of N users 221, 222, 223 the following additional information fields: user name and aliases 215, messaging capabilities 230, email addresses 240, fax addresses 250, IP data 260, URL data 270, multimedia data 280 and current reach number 290.

As can be noted in FIG. 2A, there is associated with a subscriber's MIN-ESN field pair 201 in SCP database 108 a data entry field 210 for the entry data for MIN-ESN. Also, field 201, for the same user, is associated with further fields for the user including a PBX telephone number field 202 associating the user's extension 203 on the PBX for the user that is common to the WorkPhone entry 220 of AUR (FIG. 2B). Additionally, MIN field 201 (FIG. 2A) is shared in common with CellularPhone1 entry 220 (FIG. 2B). Consequently, user records can be uniquely identified. Field 202 (FIG. 2A) may be likewise found in or shared with a WorkPhone data entry of AUR database 113 (FIG. 2B). Field 204 (FIG. 2A), on the other hand, does compare with any field of AUR database 113 and indicates the particular type of PBX equipment associated with that user, and the procedures and/or signals required by that PBX to invoke a remote call forwarding feature thereon. Field 205 (FIG. 2A) indicates the user's password, if the type of PBX in field 204 requires the inputting of a password to invoke the remote call forwarding feature for a particular extension. Field 206 contains information on how to access the PBX. Specifically, as will be described hereinafter, the secure transmission medium over which such information required by the PBX is to be transmitted to the PBX by SCP 106, is, for example, via a packet computer network such as the Internet or a corporate Intranet, a wireless data network, or the SS7 signaling network.

Continuing the discussion of the information fields of SCP database 108 of FIG. 2A, field 207 contains an address associated with the transmission medium in field 206 to which the information is to be transmitted. Thus, for example, and as will be described below, if the secure transmission medium is via an Intranet over a TCP/IP WAN connection, an IP address of a terminal server 110 to which the information is to be directed may be indicated in this field of a separate record field 211. Other information, such as translation commands and special protocols required by equipment that may be connected to the PBX can be in separate fields 208 and 209, or incorporated into one of the fields described above.

Record 211, new to the present invention, shows IP terminal data in some of the entry fields 211a, for example, identifying the user e-mail address and Internet service provider and entry field 211b, for example, for other user identity data, that can be associated with a particular MIN/ESN in a common or remote database. On the other hand, an Active User Registry database 113 may contain the cellular telephone number (for example, CellularPhone1), office telephone number (WorkPhone) along with fields like field 211 (corresponding to fields 240, 270 in FIG. 2B), but perhaps not the MIN/ESN data unless so designed. According to the present invention, AUR database 113 has sufficient information in field 295 to obtain access to SCP database 108 as needed to determine the MIN-ESN information and PBX detail information needed to effectuate remote call forwarding remotely from IP terminal 112.

With reference again to FIG. 1 and in the specific embodiment described herein, the information retrieved by SCP 106 from SCP database 108, including the MIN of the subscriber's cellular phone, is encapsulated into a message and transmitted over a secure corporate Intranet, a TCP/IP WAN 109, to a terminal server 110 at an IP address specified in field 207. The terminal server 110 receives the message, performs a protocol conversion to the command signals that need to be input to the PBX 101, and sends these commands, together with any necessary translation commands, to a modem 111 that is actually connected to PBX 101. Modem 111 appears to PBX 101 as a station set on the PBX, and the command information including the dial codes, the subscriber's extension number, MIN to which calls are to be forwarded to, the subscriber's password, if necessary, etc., are input to PBX 101 to effect the call forwarding capability of PBX 101. Although this embodiment shows a modem 111 interconnecting the terminal server 110 and PBX 101, in an alternative preferred embodiment, the PBX 101 may have its own internal modem to which the terminal server can be connected, or may have an inherent Internet capability to receive the information directly from TCP/IP WAN 109. Further, the terminal server 110—modem 111 combination could be an intelligent platform that could have more sophisticated control of PBX 101. This more intelligent control could even include control of the administration terminal of the PBX from which more sophisticated and complicated commands could be entered.

In the embodiment described above, the information necessary to invoke the remote call forwarding feature in PBX 101 is preferably transmitted from SCP 106 via a secure Intranet TCP/IP WAN connection 109, although a non-secure network may be used. Other secure transport mediums besides TCP/IP WAN connection 109 could also be used, for example, a wireless data network, a secure Internet connection, or any other secure network.

Advantageously, the present invention enables feature changes to be communicated to the subscriber's PBX 101 initiated via IP terminal 112 through the input by the user at terminal 112 of a feature code. Further, through the wireless handshake between the cellular phone 103 and the MSC 105, which uniquely and unambiguously recognizes the registered user of the cellular set, a user is located automatically and calls can be remotely transferred to cellular telephone 103 originally directed to PBX 101.

Figure 3:
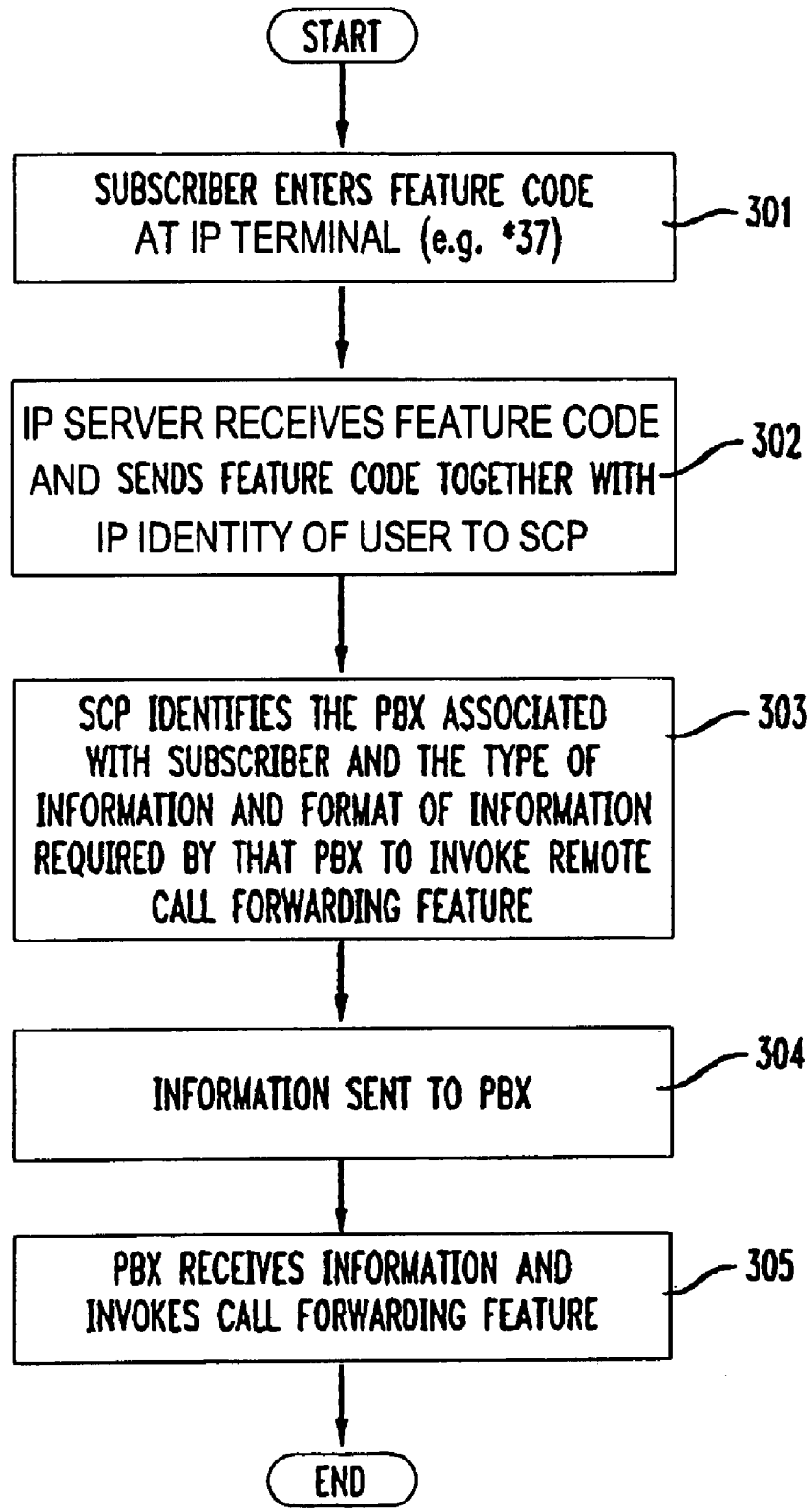
FIG. 3 is a flowchart detailing the steps of the present invention.

FIG. 3 illustrates the steps of the present invention. At step 301, the user enters from his IP terminal 112 the feature code (e.g., *37) to invoke remote call forwarding of calls directed to his PBX extension to his cellular phone. The remote server is preferably an Internet service provider's remote server or one associated with PBX 101 such as server 110. The remote server accesses an AUR database according to the present invention, responsive to receipt of the code, to determine how to obtain MIN-ESN data. The remote server then initiates a query to SCP database 108 to obtain the data using commonly known information such as feature code, cellular telephone number (MIN) and/or PBX extension number or unique combinations thereof for a given user. At step 302, the IP server receives and recognizes the feature code. The IP server then forwards that feature code together with the IP identity of the user, for example, with commonly shared database information such as cellular phone number and/or PBX telephone and extension number to the SCP 106 and SCP database 108. The SCP 106 recognizes that feature code as a request for remote call forwarding of a subscriber's PBX calls. At step 303, using the MIN/ESN identity, the SCP 106 knows in the future to remote call forward calls to MSC 105 and identifies the PBX 101 associated with that MIN/ESN, and for that identified PBX, the type of information and the format required by that PBX to invoke a remote call forwarding of calls to a cellular phone MIN. At step 304, that information in the required format is sent to the PBX 101 over a secure transport medium. At step 305, the PBX receives that information and invokes the remote call forwarding feature.

In the above description, it was assumed that the user desired to remotely invoke call forwarding of calls from his/her office number, which is associated with a PBX.

Remote call forwarding is also a feature available for home or small business subscribers from Local Exchange Carriers through their electronic local switches such as the No. 5ESS switch, manufactured by Lucent Technologies, Inc. By dialing a feature code associated with remote call forwarding of non-PBX type of calls (e.g., *38), call forwarding of calls from a user's non-PBX telephone line to a user's cellular phone can be invoked in a manner similar to that described above for a user's PBX line. With reference to FIG. 4, the user at telephone 401, which may be wired or cordless or a fixed wireless phone, is connected over a conventional local loop to a local switch 402 at his Local Exchange Company (LEC). If that local switch 402 is an electronic switch and if the user at telephone 401 is a subscriber to a call forwarding feature, the user can call forward calls from station set 401 to another telephone number associated with local switch 402 or any other switch by entering a feature code and the forwarding number in a conventional manner. If the user also subscribes to a remote call forwarding feature that enables him/her to invoke the call forwarding feature from a remote telephone to which he/she wants calls redirected, the user dials a special telephone number associated with his/her local switch from the remote telephone, and then may enter a PIN, if required, and a feature code in a conventional manner. The user's local switch receives the number of the remote telephone from the network and then forward calls placed to the user's number to the remote telephone.

In accordance with the present invention, the subscriber at IP terminal 412 enters the special feature code (e.g.,*38) to invoke remote call forwarding, which is received at a server having an associated AUR database, (one of AUR databases 413a, 413b or 413c) for obtaining enough information to query or transfer control to SCP 406 and associated SCP database 408 having MIN/ESN data The IP server sends that feature code together with cellular phone and home telephone data (HomePhone1 or HomePhone2, whichever has remote call forwarding) to determine the MIN/ESN identity of cellular phone 403 to SCP 406 via a secure network as described above which may be any secured network connection known in the art. SCP 406 recognizes that feature code as a request to remotely invoke a call forwarding feature at a local switch. At SCP 406, SCP database 408 is accessed to retrieve a record associated with the user identifying the MIN/ESN. That database, similar to the database previously described in FIG. 2A, contains additional data fields (not shown) which provide the information necessary for accessing local switch 402 and the home telephone number for which remote call forwarding is to be invoked for comparison purposes. The contact information would include the type of local switch (analogous to PBX field 204) associated with the user in addition to the other information that is required to interact with switch 402 to invoke the remote call forwarding feature to forward calls to the subscriber's cellular telephone 403. This may include, if required, the subscriber's PIN (analogous to password 205) and the IP address of a terminal server 410 (analogous to field 207) that is connected to switch 402 and to which SCP 106 is connected via an Intranet TCP/IP WAN 409.

In a preferred embodiment of the present invention, IP terminal 412 may initiate the IP connection to terminal server 410 and associated AUR database 413c, limiting the amount of data flow required between remote server and SCP 406. For example, the user may have an AUR database established at his/her work place which has a secure web site at terminal server 110 coupled to the work location's PBX 101.

The TCP/IP Wan 409 is a particular embodiment of a secure network over which the call forwarding information may be transmitted as necessary. As in the embodiment of FIG. 1, other secure transport mediums could be used between SCP 406 and local switch 402. Terminal server 410 performs the protocol conversions on the information transmitted in TCP/IP format from SCP 406 so that local switch 402, in response thereto, invokes call forwarding of those calls to the subscriber's cellular telephone 403 from the subscriber's land-line telephone 401.

Although the embodiments described above have described methods whereby a user may remotely invoke a call forwarding feature for a work or home phone having the feature to a cellular telephone from an IP connection, the present invention could also be used to remotely invoke other special features from the IP connection. These obviously would include remotely canceling call forwarding to the cellular telephone and other features that can be associated with a user's local telephone service, or are provided through a PBX, whether such features are currently available or may be made available at any time in the future. Further, although described in conjunction with a voice telephone, the present invention could be used to remotely invoke call forwarding of calls of any type, data or otherwise, to a wireless station set of any kind, from any kind of wire-line station set via an IP connection. Further, although described in conjunction with a cellular telephone, the present invention could be used in conjunction with any type or wireless telephone including, but not limited to digital and/or analog wireless telephones using Time Division Multiple Access or Code Division Multiple Access technologies and/or any other technology.

The above-described embodiments are illustrative of the principles of the present invention. Those skilled in the art may devise other embodiments without departing from the spirit and scope of the present invention. Any United States patent applications and issued patents referenced herein should be deemed to be incorporated by reference as to their entire subject matter and contents.

The invention claim is:

1. A method of invoking a feature associated with a user's line on a wire-line facility via an IP connection, the feature involving a user's wireless station set, the method comprising the steps of:
   a) receiving a feature code from an IP terminal indicative of the feature to be invoked at a server;
   b) responsive to the received feature code, the server determining the user's wire-line and wireless facilities and associated information required to invoke the feature in association with the user's line on the wire-line facility including to what service control point and in what manner to send that information; and
   c) sending that information to the service control point in the manner determined in step b) to invoke the feature in association with the user's line on the wire-line facility.

2. The method of claim 1 wherein the information is sent in step c) over a secure transmission medium.

3. The method of claim 2 wherein the secure transmission medium is a wireless data network.

4. The method of claim 2 wherein the secure transmission medium is a packet computer network.

5. The method of claim 3 wherein the wireless station set is a cellular telephone.

6. The method of claim 1 wherein the feature is remote call forwarding to forward a call directed to the user's line on the wire-line facility to the user's wireless station set.

7. The method of claim 1 wherein the feature is deactivation of an activated remote call forwarding feature which forwards calls directed to the user's line on the wire-line facility to the user's wireless station set.

8. The method of claim 6 wherein the user's line on the wire-line facility is associated with a PBX and the information further includes how to access the PBX for invoking the remote call forwarding feature on the user's line of the PBX.

9. The method of claim 6 wherein the user's line on the wire-line facility is associated with a central office switch and the information further includes how to access the central office switch and invoke the remote call forwarding feature on the subscriber's line of the central office switch.

10. A system for invoking a feature associated with a user's line on a wire-line facility from an IP connection, the feature involving the subscriber's wireless station set, the system comprising:
   a server which receives a feature code from an IP terminal indicative of the feature to be invoked;
   a database accessible by said service having IP terminal data and information determining a service control point for the feature and how to send information to the service control point and
   the service control point and an associated database, the service control point receiving an identifier associated with the wireless station set and the received feature code and retrieving from the database information associated with the received identifier information required to invoke the feature in association with the user's line on the wire-line facility including to where and how to send the information.

11. The system of claim 10 wherein the server and the service control point are connected over a secure transmission facility.

12. The system of claim 10 wherein the wireless station set is a cellular telephone.

13. The system of claim 10 wherein the feature is remote call forwarding to forward a call directed to the user's line on the wire-line facility to the user's wireless station set.

14. The system of claim 10 wherein the feature is deactivation of the activated remote call forwarding feature which forwards calls directed to the user's line on the wire-line facility to the user's wireless station set.

15. The system of claim 13 wherein the user's line on the wire-line facility is associated with a PBX and the information includes how to access the PBX for invoking the remote call forwarding feature on the user's line of the PBX.

16. The system of claim 13 wherein the user's line on the wire-line facility is associated with a central office switch and the information includes how to access the switch and invoke the remote call forwarding feature on the user's line of the central office switch.

17. A method of invoking a remote call forwarding feature associated with a user's telephone line on a wire-line facility from an IP connection, the remote call forwarding feature involving a user's mobile wireless telephone to forward calls directed to the wire-line telephone line to the wireless telephone, the method comprising the steps of:
   a) receiving at a server a feature code from an IP terminal indicative of the remote call forwarding feature to be invoked;
   b) responsive to the received feature code, the server determining the user's telephone line on the wire-line facility and the user's wireless telephone line and associated information required to invoke the remote call forwarding feature on the user's telephone line on the wire-line facility including to what service control point and how to send that information; and
   c) sending that information to the determined service control point in the manner determined in step b) to invoke the remote call forwarding feature on the user's telephone line on the wire-line facility.

18. The method of claim 17 wherein the user's line on the wire-line facility is associated with a PBX and the determined service control point determines information how to access the PBX and invoke the remote call forwarding feature on the user's line of the PBX.

19. The method of claim 17 wherein the user's line on the wire-line facility is associated with a central office switch and the determined service control point determines information how to access the central office switch and invoke the remote call forwarding feature on the subscriber's line of the central office switch.

* * * * *